(12) United States Patent
Sim et al.

(10) Patent No.: US 8,281,384 B2
(45) Date of Patent: Oct. 2, 2012

(54) METHOD OF ENABLING ACCESS TO DATA PROTECTED BY FIREWALL

(75) Inventors: Wong Hoo Sim, Singapore (SG); Seh Eing Lim, Singapore (SG)

(73) Assignee: Creative Technology Ltd, Singapore (SG)

( * ) Notice: Subject to any disclaimer, the term of this patent is extended or adjusted under 35 U.S.C. 154(b) by 178 days.

(21) Appl. No.: 12/676,889

(22) PCT Filed: Sep. 4, 2008

(86) PCT No.: PCT/SG2008/000329
§ 371 (c)(1),
(2), (4) Date: Mar. 5, 2010

(87) PCT Pub. No.: WO2009/031976
PCT Pub. Date: Mar. 12, 2009

(65) Prior Publication Data
US 2010/0228779 A1    Sep. 9, 2010

(30) Foreign Application Priority Data

Sep. 5, 2007  (SG) ................................ 200706512-1

(51) Int. Cl.
*G06F 17/00* (2006.01)
(52) U.S. Cl. ................ 726/11; 726/12; 726/13; 726/14; 713/153
(58) Field of Classification Search .................. 707/782, 707/E17.001
See application file for complete search history.

(56) References Cited

U.S. PATENT DOCUMENTS

| | | | | |
|---|---|---|---|---|
| 7,036,141 | B1 * | 4/2006 | Hammarstrom et al. | 726/11 |
| 7,043,644 | B2 * | 5/2006 | DeBruine | 713/153 |
| 7,124,189 | B2 * | 10/2006 | Summers et al. | 709/227 |
| 7,200,660 | B2 * | 4/2007 | Bruegger et al. | 709/225 |
| 7,698,400 | B1 * | 4/2010 | Beloussov et al. | 709/223 |
| 7,821,926 | B2 * | 10/2010 | Hannel et al. | 370/229 |
| 2002/0103998 | A1 * | 8/2002 | DeBruine | 713/153 |
| 2002/0166068 | A1 * | 11/2002 | Kilgore | 713/201 |
| 2006/0123225 | A1 * | 6/2006 | Sharma et al. | 713/153 |
| 2007/0002011 | A1 * | 1/2007 | Kurlander et al. | 345/156 |
| 2009/0190602 | A1 * | 7/2009 | Sung et al. | 370/401 |

FOREIGN PATENT DOCUMENTS

WO    2004/030308 A1    4/2004

OTHER PUBLICATIONS

Smaldone et al., "Firewall: A Firewall for Network File Systems," IEEE, 2007, pp. 153-163.*
Knobbe et al., "Advanced Security Proxies: An Architecture and Implementation for High-Performance Network Firewalls," NAI Labs, Network Associates, 2000, pp. 1-9.*
Markham et al., "Security at the Network Edge: A Distributed Firewall Architecture," IEEE, 2001, pp. 279-288.*
Son et al., "CODO: Firewall Traversal by Cooperative On-Demand Opening," IEEE, 2005, pp. 233-243.*

* cited by examiner

*Primary Examiner* — Luu Pham
(74) *Attorney, Agent, or Firm* — Creative Technology Ltd

(57) ABSTRACT

Methods of enabling access to data using a portable electronic device within a private network protected by firewall are disclosed. The data may be transmitted in packets to the portable electronic device and may be consumed either instantly or subsequently. The methods may utilise either at least one web storage or an agent server.

8 Claims, 4 Drawing Sheets

METHOD OF ENABLING ACCESS TO DATA PROTECTED BY FIREWALL

BACKGROUND AND FIELD OF THE INVENTION

This invention relates to a method of enabling access to data protected by firewall.

Communications networks can be broadly classified into public (or open) and private networks. Most computers are connected to the public network such as the internet and information on the public network is usually easily accessible. On the other hand, a private network is usually protected behind a firewall to prevent unauthorised access. Personal files and data are generally stored in private networks to ensure security and maintain a degree of privacy.

However, with the increased adoption of mobile communications and the internet, access to the private network via the public network is becoming increasingly commonplace.

To gain access to private networks, it is necessary to bypass or "punch through" the firewall. Virtual Private Networks (VPN) or Network Address Translation (NAT) traversal are some techniques which have been conceived to achieve this. However, such techniques have its disadvantages.

It is an object of the present invention to provide a method of enabling access to data protected by firewall to address the problem of the above prior art and/or to provide the public with a useful choice.

Reference in the specification is made to U.S. Pat. No. 6,928,433 titled "Automatic Hierarchical Categorization of Music By Metadata" which is assigned to Creative Technology Ltd. The reference is made in relation to a media file management application that will be mentioned in the section titled "Detailed Description of the Preferred Embodiment".

SUMMARY OF THE INVENTION

In a first aspect, there is provided a method of enabling access to data within a private network protected by firewall, the firewall being configured to prevent an electronic device communicatively coupled to a public communications network from unauthorised access to the data. The method preferably comprises i) a user of a portable electronic device triggering the accessing/downloading of the data from the private network; ii) copying and transmitting the data from the private network to at least one transient storage external of the firewall, the transient storage being accessible solely by a dedicated conduit from the private network; and iii) transmitting the data from the at least one transient storage to the portable electronic device. The data is transmitted in packets to the portable electronic device and may be consumed either instantly or subsequently.

It is preferable that triggering of the accessing/downloading of the data from the private network is by running an application on the portable electronic device, the application causing the data to be processed at the private network prior to transmission from the private network.

It is advantageous that the transient storage is a data buffer when the data transmitted to the portable electronic device is consumed instantly. It is also advantageous in relation to data privacy that data is purged from the transient storage once it has been transmitted to the portable electronic device.

In a second aspect, there is provided a method of transmitting data to a private network protected by firewall, the firewall being configured to prevent an electronic device communicatively coupled to a public communications network from unauthorised access to the data. The method comprises i) a user of a portable electronic device triggering the transmission of the data to the private network; ii) transmitting the data from the portable electronic device to at least one transient storage external of the firewall, the transient storage being accessible to the private network solely by a dedicated conduit; and iii) transmitting the data from the transient storage to the private network. The data may be transmitted in packets and it is preferable that the triggering of the transmission of data from the portable electronic device to the private network is by running an application on the portable electronic device. Preferably, the data is purged from the transient storage once it has been transmitted to the private network.

In a final aspect, there is provided an alternative method of enabling access to data within a private network protected by firewall, the firewall being configured to prevent an electronic device communicatively coupled to a public communications network from unauthorised access to the data. The alternative method comprises i) a user of a portable electronic device triggering a connection to a computer system within a private network; ii) an agent server assisting in the connection; and iii) transmitting the data to/from the computer system to the portable electronic device. It is advantageous that the agent server provides the user with information on which computer system is online and the requisite IP address(es) to aid in the connection.

BRIEF DESCRIPTION OF THE DRAWINGS

An embodiment of the invention will now be described, by way of example, with reference to the accompanying drawings in which.

DETAILED DESCRIPTION OF THE PREFERRED EMBODIMENT

Figure 1:
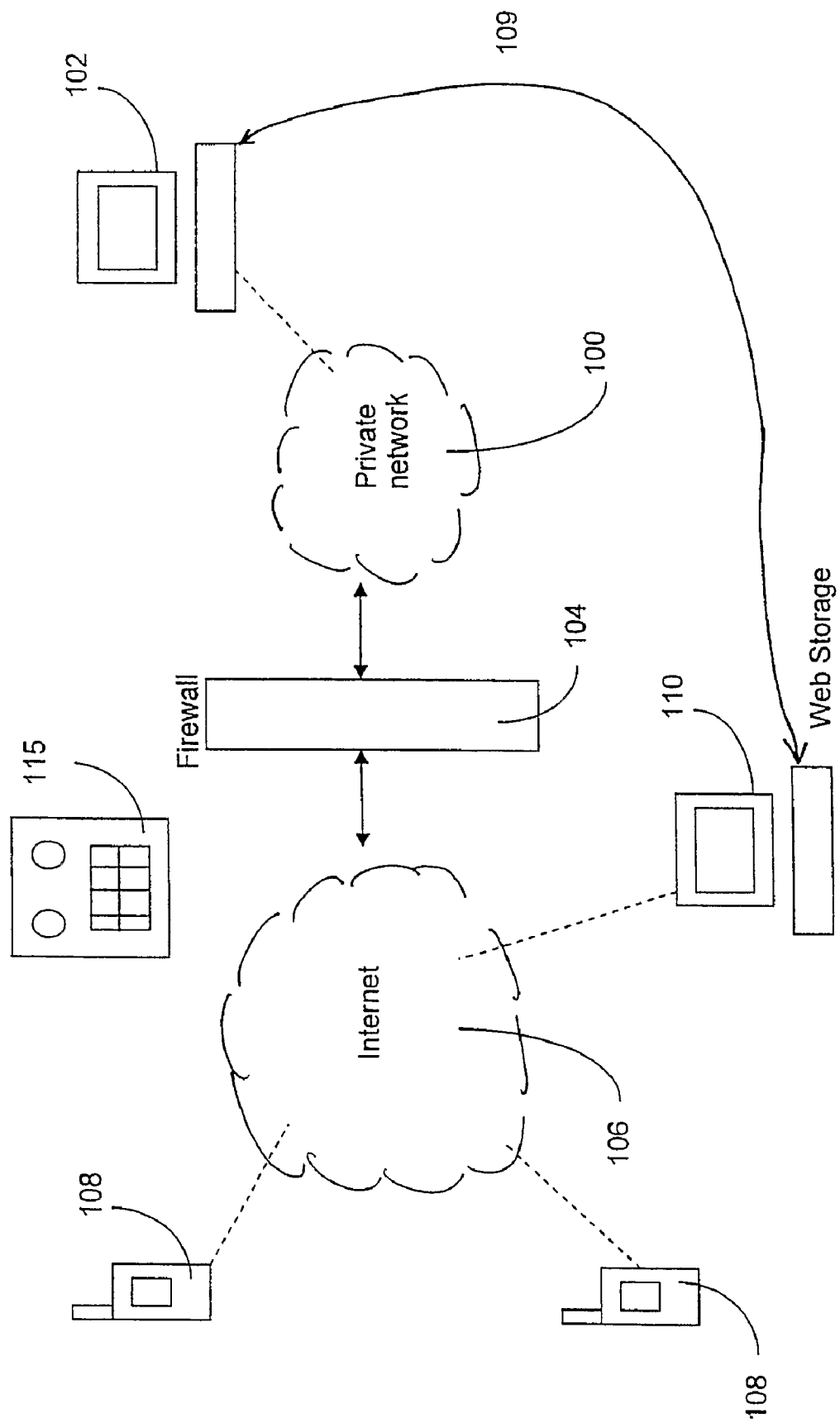
FIG. 1 shows an infrastructure for remotely accessing data stored within a secure private network.

FIG. 1 shows an infrastructure for remotely accessing data stored within a secure private network 100 and the infrastructure comprises a computing system 102 residing within the private network 100, a firewall 104 configured to regulate the data traffic between the private network 100 and the internet 106. A number of portable electronic devices 108 are communicatively coupled to the internet and similarly at least one storage device 110 configured as web storage. It should be appreciated that whenever the portable electronic device 108 and the computing system 102 requires a data link, a direct connection between the portable electronic device 108 and the computing system 102 is usually sought, but the direct connection may not always be obtainable.

To solve the above problem, in this embodiment, data is copied and transferred via a dedicated conduit 109 to each of the at least one web storage 110 which functions like a transient storage between the private network 100 and the portable electronic devices 108 and for the portable electronic devices 108 to download the data from the at least one web storage 110 rather than the computing system 102 residing behind the firewall 104. Thus, this obviates the need of implementing complex rules for the firewall 104.

The dedicated conduit 109 is set up when an account is activated for the at least one web storage 110. A single account can be usable for a plurality of the web storage 110. After the account is activated for the at least one web storage 110, the dedicated conduit 109 is accessible (usable) when a user of the account is verified using known verification techniques involving, for example, passwords, biometric verification, and so forth. The access to the dedicated conduit 109 is initiated by the user from one of the portable electronic devices 108. Thus, a request to access data from the private network 100 is initiated from the user from one of the portable electronic devices 108.

The duplicated data from the private network 100 to the at least one web storage 110 may be separable into discrete portions, with the discrete portions being transmitted from the private network 100 to various web storage 110 via respective dedicated conduits 109. A distribution of the discrete portions is controllable from within the private network 100, and the distribution may be conducted in a manner where the various web storage 110 is considered to be a single network storage. The discrete portions may be further duplicated for is higher redundancy. The distribution of the discrete portions may be similar in aspects to Redundant Array of Independent Disks (RAID) technology, where the computing system 102 within the private network 100 controls the distribution of the discrete portions and subsequent re-combination of the discrete portions.

The portable electronic devices 108 may run applications to process data on the computing system 102 with output of processed data being shown on the portable electronic devices 108. An example of the application being run on the portable electronic devices 108 is a media file management and playback application. A user of the portable electronic devices 108 may request to playback a number of media files which are stored in the computing system 102. When this happens, the portable electronic device 108 firstly attempts to make a direct connection to the private network 100. If the attempt to make the direct connection to the private network 100 fails, the portable electronic device 108 sends a first request for the media files to the at least one web storage 110, which consequently sends a second request to the computing system 102 within the private network 100 to obtain the requisite media files. The second request may be sent via the dedicated conduit 109. The requisite media files are processed in the computing system 102 and sent via the dedicated conduit 109 to the at least one web storage 110 for transmission to the portable electronic device 108, where the processed media files are presented to the user.

In other words, the data (either in its entirety or in discrete portions) is drawn and temporarily stored in the at least one web storage 110 once a request is made by the user with a portable electronic device 108. The data (in terms of data packets) is purged from the at least one web storage 110 once it has been transferred to the portable electronic device 108. This means that during a process whereby the portable electronic device 108 requests and subsequently obtains data from the computer system 102 within the private network 100, no complete copy of the data is stored on the at least one web storage 110. This protects the users' privacy as the at least one web storage 110 does not store a complete copy of the data which may be accessed by unauthorised parties.

The infrastructure as described earlier obviates a need for the portable electronic device 108 to have large storage capacities. Using the aforementioned infrastructure would allow the user to access an entire storage of at least one computer system 102. Each portable electronic device 108 merely requires adequate storage to receive the processed data for either instant or subsequent consumption of the processed data. Given that the data is also processed by the computer system 102 prior to transmission, data processing on each portable electronic device 108 is minimised. This obviates the need to incorporate leading-edge processors in each portable electronic device 108, correspondingly lowering the cost to produce the portable electronic device 108 with little detriment in relation to performance of the portable electronic device 108.

If the user wishes to add the processed data to a personal collection in the instance where the processed data is not owned by the user, the infrastructure also allows for the user to transmit the processed data from the portable electronic device 108 to the user's own computer system 102 via the at least one web storage 110.

The data is transferred to the at least one web storage 110 which functions like a transient storage between the private network 100 and the portable electronic device 108. The portable electronic device 108 duplicates and downloads the data to the at least one web storage 110 and subsequently to the computing system 102 residing behind the firewall 104. The transfer of data from the at least one web storage 110 to the computing system 102 is via the dedicated conduit 109. Thus, this also obviates the need of implementing complex rules for the firewall 104.

The dedicated conduit 109 is set up when an account is activated for the at least one web storage 110. A single account can be usable for a plurality of the web storage 110. After the account is activated for the at least one web storage 110, the dedicated conduit 109 is accessible (usable) when a user of the account is verified using known verification techniques involving, for example, passwords, biometric verification, and so forth. The access to the dedicated conduit 109 is initiated by the user from one of the portable electronic devices 108. Thus, a request to transfer data to the private network 100 is initiated from the user from one of the portable electronic devices 108.

The duplicated data from the portable electronic device 108 to the at least one web storage 110 may be separable into discrete portions, with the discrete portions being transmitted from the portable electronic device 108 to various web storage 110. A distribution of the discrete portions is controllable from the portable electronic device 108, and the distribution may be conducted in a manner where the various web storage 110 is considered to be a single network storage. The discrete portions may be further duplicated for higher redundancy. The distribution of the discrete portions may be similar in aspects to Redundant Array of Independent Disks (RAID) technology, where the portable electronic device 108 controls the distribution of the discrete portions and subsequent re-combination of the discrete portions. The discrete portions may be transferred from the various web storage 110 to the computing system 102 in the private network 100 via respective dedicated conduits 109.

A user of the computing system 102 may request to playback a number of media files which are stored in the portable electronic device 108. A direct connection of the computing system 102 to the portable electronic device 108 is typically possible as the portable electronic device 108 usually resides in an open network. However, when issues arise preventing the direct connection between the computing system 102 and the portable electronic device 108, the computing system 102 sends a first request for the media files to the at least one web storage 110, which consequently sends a second request to the portable electronic device 108 to obtain the requisite media files. The first request may be sent via the dedicated conduit 109. The requisite media files are sent to the at least one web storage 110 from the portable electronic device 108, and subsequently transmitted to the computing system 102, where the processed media files are presented to the user. Transmission of the requisite media files from the at least one web storage 110 to the computing system 102 is via the respective dedicated conduit 109.

The duplicated data (either in its entirety or in discrete portions) is drawn and temporarily stored in the at least one web storage 110 once a request is made by the user with from the computing system 102. The data (in terms of data packets) is purged from the at least one web storage 110 once it has been transferred to the computing system 102. This means that during a process whereby the computing system 102 requests and subsequently obtains data from the portable electronic device 108, no complete copy of the data is stored on the at least one web storage 110. This protects the users' privacy as the at least one web storage 110 does not store a complete copy of the data which may be accessed by unauthorised parties.

In such an instance, the data may also be purged from the portable electronic device 108 once the data is transmitted from the portable electronic device 108. Similarly, the data is purged from the at least one web storage 110 once it has been transferred to the computing system 102 in the private network 100.

In the instance where the user desires instant consumption of the processed data from the computer system 102, the at least one web storage 110 also serves as a data buffer such that consumption of the processed data is similar to a user experience consuming data stored natively on the portable electronic device 108.

Figure 2:
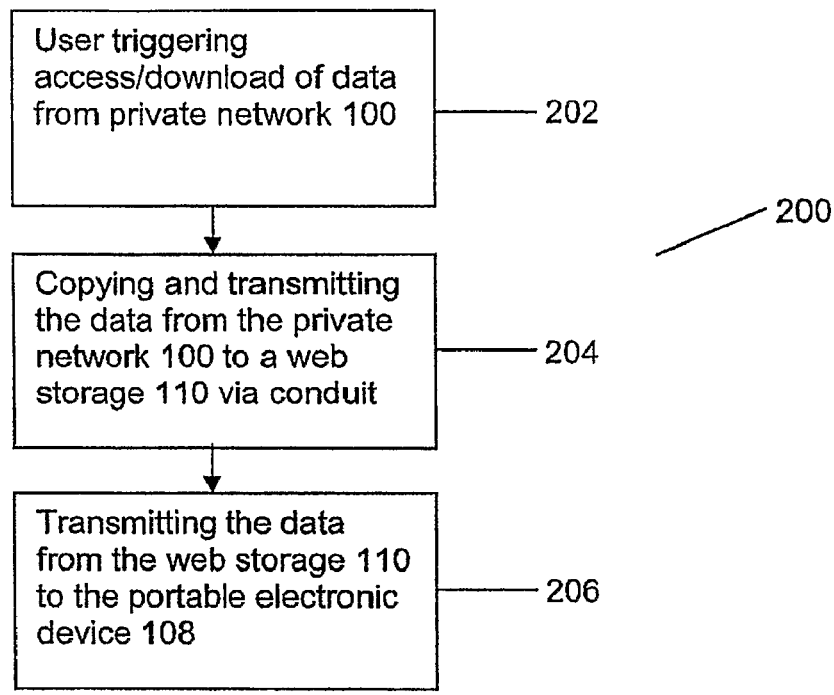
FIG. 2 shows a process flow for a method for remotely accessing data stored within a secure private network.

Referring to FIG. 2, there is shown a process flow of a method (200) for remotely accessing data stored within a secure private network 100 protected by firewall 104, the firewall 104 being configured to prevent an electronic device communicatively coupled to a public communications network from unauthorised access to the data. It should be appreciated that whenever the electronic device and a computing system in the secure private network 100 requires a data link, a direct connection between the electronic device and the computing system is usually sought, but the direct connection may not always be obtainable. The method (200) is correspondingly employed to overcome the problem.

The method (200) includes a user of a portable electronic device 108 triggering the accessing/downloading of the data from the private network (202). The triggering of the accessing/downloading of the data from the private network 100 is by running an application on the portable electronic device 108, the application causing the data to be processed at the private network 100 prior to transmission from the private network 100.

Subsequently, the data is copied and transmitted from the private network 100 to the at least one web storage 110 external of the firewall 104 (204), the at least one web storage 110 being accessible solely by a dedicated conduit 109 from the private network 100. The dedicated conduit 109 is set up when an account is activated, for the at least one web storage 110. A single account can be usable for a plurality of the web storage 110. After the account is activated for the at least one web storage 110, the dedicated conduit 109 is accessible (usable) when a user of the account is verified using known verification techniques involving, for example, passwords, biometric verification, and so forth. The access to the dedicated conduit 109 is initiated by the user from one of the portable electronic devices 108. Thus, a request to access data from the private network 100 is initiated from the user from one of the portable electronic devices 108.

The duplicated data is transmitted in packets during the process. The data from the private network 100 to the at least one web storage 110 may be separable into discrete portions, with the discrete portions being transmitted from the private network 100 to various web storage 110 via respective dedicated conduits 109. A distribution of the discrete portions is controllable from within the private network 100, and the distribution may be conducted in a manner where the various web storage 110 is considered to be a single network storage. The discrete portions may be further duplicated for higher redundancy. The distribution of the discrete portions may be similar in aspects to Redundant Array of Independent Disks (RAID) technology, where the computing system 102 within the private network 100 controls the distribution of the discrete portions and subsequent re-combination of the discrete portions.

The data is then transmitted from the at least one web storage 110 to the portable electronic device 108 (206). The data may be pulled from the at least one web storage 110 by the portable electronic device 108 if the at least one web storage 110 does not include scripts to push data from the at least one web storage 110 to the portable electronic device 108. The data is purged from the at least one web storage 110 once it has been transmitted to the portable electronic device 108. As such, no complete copy of the data is stored on the at least one web storage 110. This protects the users' privacy as the at least one web storage 110 does not store a complete copy of the data which may be accessed by unauthorised parties.

The data transmitted to the portable electronic device 108 is consumed either instantly or subsequently by the user. The at least one web storage 110 acts as a data buffer when the data transmitted to the portable electronic device 108 is consumed instantly. It can be seen that using the aforementioned method (200) would allow the user to access an entire storage of at least one computer system 102 on the private network 100.

Figure 3:
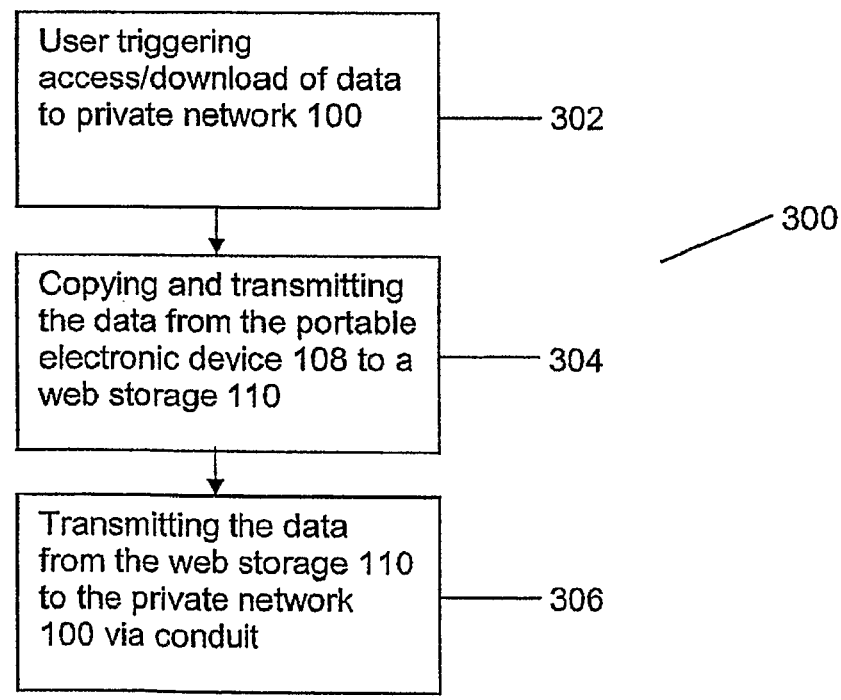
FIG. 3 shows a process flow for a method for transmitting data stored to a secure private network.

Referring to FIG. 3, there is shown a method (300) of transmitting data to a private network 100 protected by firewall 104, the firewall 104 being configured to prevent an electronic device communicatively coupled to a public communications network from unauthorised access to the data. It should be appreciated that whenever the electronic device and a computing system in the secure private network 100 requires a data link, a direct connection between the electronic device and the computing system is usually sought, but the direct connection may not always be obtainable. The method (300) is correspondingly employed to overcome the problem.

The method (300) includes a user of a portable electronic device 108 triggering the transmission of the data (in packets) to the private network 100 (302). The triggering of the transmission of data from the portable electronic device 108 to the private network 100 is by running an application on the portable electronic device 108.

Subsequently, the data is transmitted from the portable electronic device 108 to at least one web storage 110 external of the firewall 104 (304), the at least one web storage 110 being accessible to the private network 100 solely by a dedicated conduit 109. The dedicated conduit 109 is set up when an account is activated for the at least one web storage 110. A single account can be usable for a plurality of the web storage 110. After the account is activated for the at least one web storage 110, the dedicated conduit 109 is accessible (usable) when a user of the account is verified using known verification techniques involving, for example, passwords, biometric verification, and so forth. The access to the dedicated conduit 109 is initiated by the user from one of the portable electronic devices 108. Thus, a request to access data from the private network 100 is initiated from the user from one of the portable electronic devices 108.

The duplicated data is transmitted in packets during the process. The data from the portable electronic device 108 to the at least one web storage 110 may be separable into discrete portions, with the discrete portions being transmitted from the portable electronic device 108 to various web storage 110. A distribution of the discrete portions is controllable from the portable electronic device 108, and the distribution may be conducted in a manner where the various web storage 110 is considered to be a single network storage. The discrete portions may be further duplicated for higher redundancy. The distribution of the discrete portions may be similar in aspects to Redundant Array of Independent Disks (RAID) technology, where the portable electronic device 108 controls the distribution of the discrete portions and subsequent re-combination of the discrete portions.

The data is then transmitted from the at least one web storage 110 to the private network 100 (306) via the dedicated conduit 109. The data may be pulled from the at least one web storage 110 by the private network 100 if the at least one web storage 110 does not include scripts to push data from the at least one web storage 110 to the private network 100. The data is purged from the at least one web storage 110 once it has been transmitted to the private network 100. As such, no complete copy of the data is stored on the at least one web storage 110. This protects the users' privacy as the at least one web storage 110 does not store a complete copy of the data which may be accessed by unauthorised parties.

Figure 4:
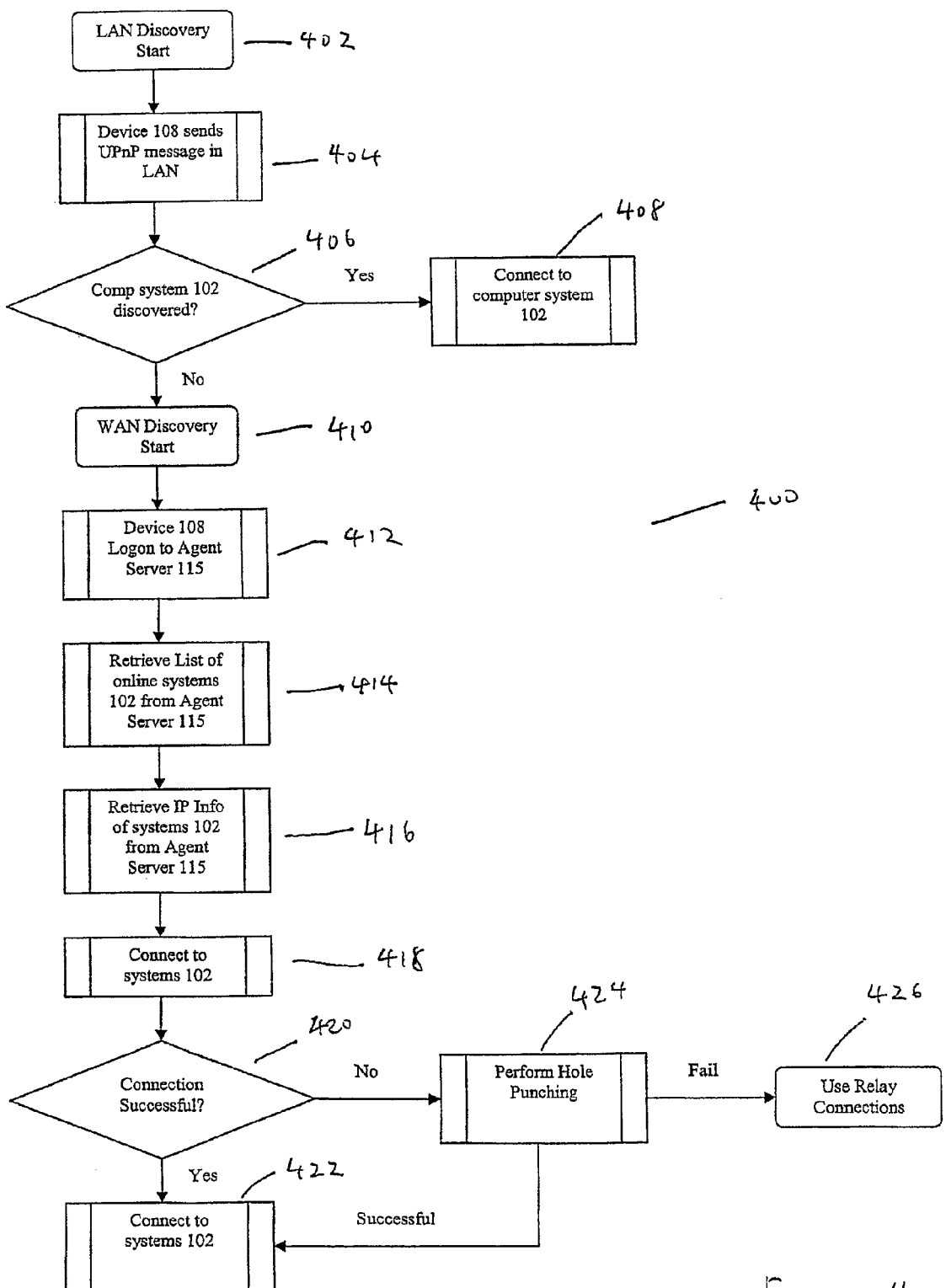
FIG. 4 shows a process flow for an alternative method for remotely accessing data stored within a secure private network.
Figure 5:
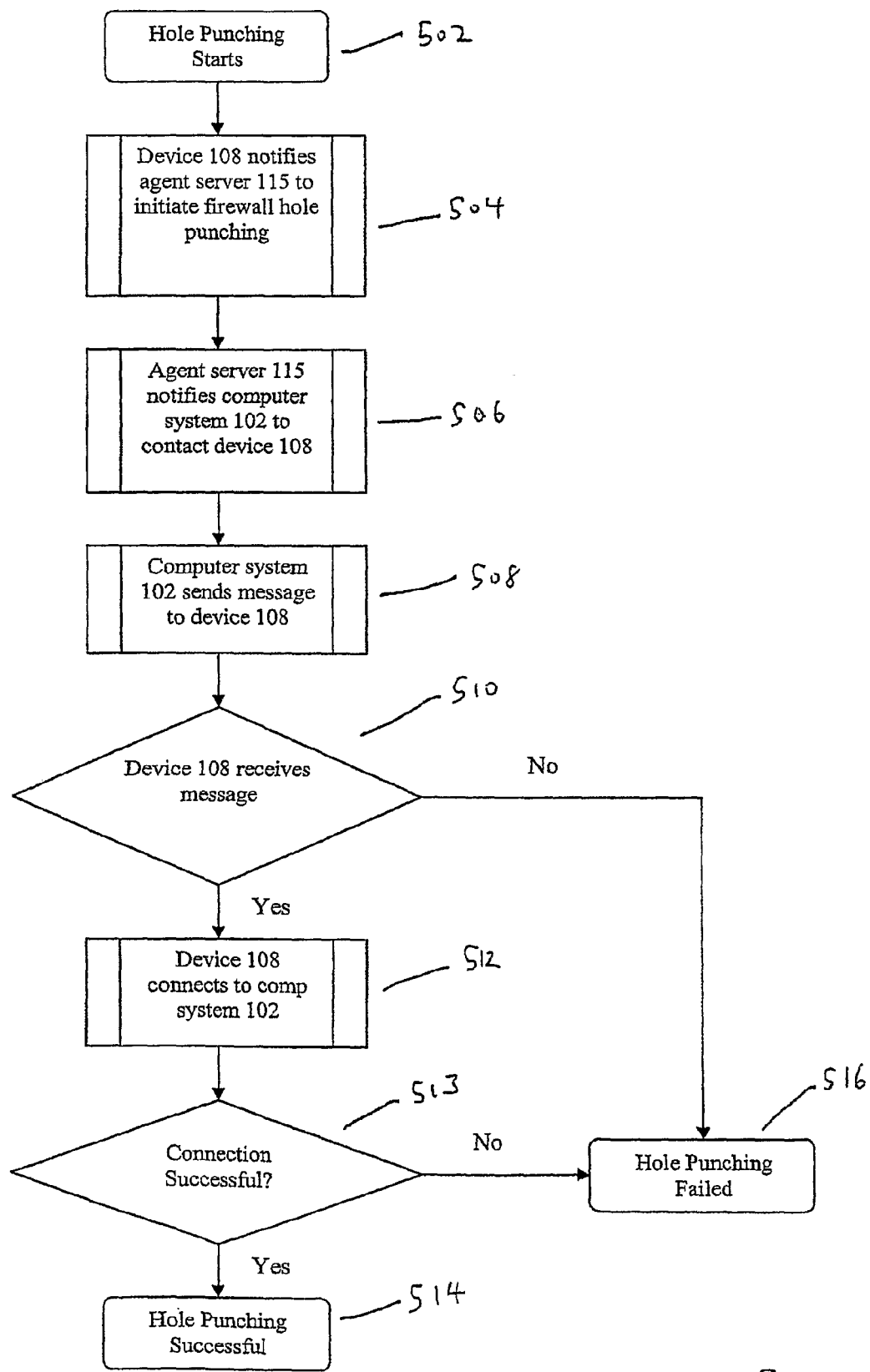
FIG. 5 shows a process flow for an intermediate part of the alternative method of FIG. 4.

Referring to FIGS. 4 and 5, there is shown an alternative method 400 for enabling access to data within a private network 100. Firstly, it is determined whether the portable electronic device 108 is within a Local Area Network (LAN) (402). The device 108 may send a Universal Plug and Play (UPnP) message (404) to locate a computer system 102 (406) within the private network 100. If the computer system 102 is found, the device 108 then connects to the computer system 102 (408) via known verification/log-on processes.

If the computer system 102 is not found, it may be an indication that the portable electronic device 108 is not within a LAN. If the portable electronic device 108 is not within a LAN, the portable electronic device 108 may enter a Wide Area Network (WAN) discovery mode (410). When the portable electronic device 108 is within a WAN, the portable electronic device 108 logs onto an agent server 115 (412) via known verification/log-on processes. Subsequent to the verification/log-on process, the agent server 115 may provide a listing of online computer systems 102 which the portable electronic device 108 may have authorised access (414). This listing of online computer systems 102 may also include specific IP addresses of the online computer systems 102.

The portable electronic devices 108 may subsequently connect to online computer systems 102 in private networks 100 (418). However, the presence of the firewalls 104 often hampers such connection attempts. In an unusual scenario when a connection attempt (420) is immediately successful (perhaps in the absence of a firewall 104), the portable electronic devices 108 may then access data on the computer system 102 (422).

In a more likely scenario when the portable electronic device 108 is unable to obtain a successful connection, firewall 104 hole punching (424) may be required. Known processes to punch through/break down a firewall 104 may be employed. Should firewall 104 hole punching fail, the portable electronic device 108 may still rely upon relay connections (426) like dedicated data conduits to enable a connection to the computer system 102 in the private network 100.

An illustrative process of firewall 104 hole punching (424) is described in further detail in FIG. 5. In order to begin the firewall 104 hole punching (502), the portable electronic device 108 notifies the agent server 115 to initiate firewall hole punching for either a particular private network 100 or a computing system 102 (504). The agent server 115 then notifies the computer system 102 to contact the portable electronic device 108 (506) via transmission of a message (508) akin to "pinging" the portable electronic device 108. If the portable electronic device 108 receives the message (510), the portable electronic device 108 then connects to the computer system 102 (512). If a successful connection (513) is made between the computer system 102 to the portable electronic device 108, it signifies the success of the firewall hole punching (514). Failure to make a successful connection between the computer system 102 to the portable electronic device 108 signifies the failure of the firewall hole punching (516).

The alternative method 400 as described earlier may facilitate both transmission to and from the portable electronic device 108.

The described embodiment should not be construed as limitative. For example, The data may be any information, application or services stored, residing or running on a PC.

Having now fully described the invention, it should be apparent to one of ordinary skill in the art that many modifications can be made hereto without departing from the scope as claimed.

The invention claimed is:

1. A method of enabling access to data within a private network, the method comprising:
   configuring a firewall to prevent electronic devices communicatively coupled to a public communication network from unauthorized access to the data within the private network protected by the firewall, the electronic devices including a portable electronic device;
   receiving a request from a user of the portable electronic device for accessing/downloading of the data stored within the private network;
   copying and transmitting the data from the private network to more than one transient storage external of the firewall, each transient storage being accessible by a dedicated conduit from the private network, wherein the dedicated conduit is setup when account of the user is activated;
   transmitting the data from at least one of the more than one transient storage to the portable electronic device;
   wherein the data transmitted to the portable electronic device is consumed either instantly or subsequently, and wherein the method further comprises:
   separating the data into discrete portions and distributing amongst the more than one transient storage via the respective dedicated conduits; and
   controlling, by the private network, the distribution of the discrete portions and subsequent re-combination of the discrete portions for transmission to the portable electronic device.

2. The method according to claim 1, wherein the data is transmitted in packets.

3. The method according to claim 1, the method further comprising:
   triggering the accessing/downloading of the data from the private network by running an application on the portable electronic device, the application causing the data to be processed at the private network prior to transmission from the private network.

4. The method according to claim 1, wherein the transient storage is a data buffer when the data transmitted to the portable electronic device is consumed instantly.

5. The method according to claim 1, wherein the data is purged from the transient storage once it has been transmitted to the portable electronic device.

6. The method according to claim 1, wherein the dedicated conduit is accessible when the user is authenticated; and wherein access to the dedicated conduit is initiated by the user from the portable electronic device.

7. A system for enabling access to data within a private network, the system comprising:
- a firewall configured to prevent portable electronic devices communicatively coupled to a public communication network from unauthorized access to the data within a private network protected by the firewall;
- a portable electronic device among the portable electronic devices;
- more than one transient storage external of the firewall; and
- a computer including a memory storing computer executable instructions that, when executed by a processor, cause the processor to perform the method involving the steps of:
  - receiving a request from a user of the portable electronic device for accessing/downloading of the data stored within the private network;
  - copying and transmitting the data from the private network to more than one transient storage external of the firewall, each transient storage being accessible by a dedicated conduit from the private network, wherein the dedicated conduit is setup when account of the user is activated;
  - transmitting the data from at least one of the more than one transient storage to the portable electronic device;
  - wherein the data transmitted to the portable electronic device is consumed either instantly or subsequently, and wherein the method further comprises the steps of:
  - separating the data into discrete portions and distributing amongst the more than one transient storage via the respective dedicated conduits; and
  - controlling, by the private network, the distribution of the discrete portions and subsequent re-combination of the discrete portions for transmission to the portable electronic device.

8. A system according to claim 7, wherein the dedicated conduit is accessible when the user is authenticated, access to the dedicated conduit being initiated by the user from the portable electronic device.

* * * * *